Patented Jan. 16, 1951

2,538,140

UNITED STATES PATENT OFFICE 2,538,140

ADSORPTION AND ELUTION OF STREPTOMYCIN EMPLOYING COLUMNAR CARBON

Frank J. Wolf, Westfield, N. J., assignor to Merck & Co., Inc., Rahway, N. J., a corporation of New Jersey No Drawing. Application December 13, 1947, Serial No. 791,653

5 Claims. (Cl. 260—210)

This invention is concerned generally with the manufacture of streptomycin. More particularly, it relates to a new and improved method for the isolation and purification of streptomycin starting with the nutrient media or broths in which the antibiotic has been elaborated by propagation of streptomycin-producing strains of *Streptomyces griseus* therein.

Streptomycin is now produced industrially by propagating streptomycin-producing strains of the fungus *Streptomyces griseus* in liquids which contain nutrients for mold growth, this propagation being carefully carried out under aerobic conditions. These liquids, both before propagation, and after propagation is completed, are usually termed nutrient media or broths. The resulting solution of streptomycin and residual food substance must then be freed of the propagating organism and other solid materials, and treated in order to recover the streptomycin therefrom.

It is known that streptomycin can be recovered from such culture broths by slurrying the broth, at neutrality, with activated carbon, thereby adsorbing the streptomycin on the carbon. The resulting streptomycin-carbon adsorbate is separated by filtration, eluted with dilute mineral acid, and the eluate neutralized, dried and treated to remove inorganic matter.

This prior method suffers from several disadvantages, namely: (1) considerable amounts of inorganic salts, which are adsorbed by the carbon, are eluted together with the streptomycin, and the separation of streptomycin from these inorganic salts is difficult and results in considerable losses of the desired product; (2) Excessive amounts of organic impurities are adsorbed and eluted together with the streptomycin which impurities hamper subsequent working up of the streptomycin for therapeutic use, by reducing the potency of and imparting toxicity to the product; (3) Relatively large amounts of activated carbon are required as compared with the quantity of streptomycin to be recovered from the broth, and it has not proven feasible, employing previously known methods, to reuse this costly activated carbon in a second adsorption operation; (4) The large amount of activated carbon employed necessitates the use of expensive recovery apparatus, such as filters and evaporators, of relatively large capacity which further adds to the cost of manufacturing streptomycin.

It has been found that it is possible to carry out the adsorption and elution operations in such a way that the separation of inorganic and organic impurities from the streptomycin product is accomplished with a moderate degree of efficiency. It has previously been considered impracticable, however, to reuse the activated carbon adsorbent, and this has necessitated that the process be carried out as a batch operation employing expensive filtering equipment from which the spent carbon is removed and discarded. Moreover, nothing in the method now in existence makes possible the preparation of the effluents containing a high concentration of streptomycin, and the resulting dilute solutions must be concentrated employing expensive evaporators of relatively large capacity.

I have now discovered an improved method of recovering streptomycin from aqueous solution, utilizing activated carbon adsorbent, which method makes possible the reuse of the activated carbon, continuous operation, and the preparation of effluents containing streptomycin relatively free from both organic and inorganic impurities and in a concentration as high as 30 times that previously obtainable.

This is accomplished by adjusting the filtered or clarified fermentation broth, or other streptomycin solution, to a suitable pH and passing the resulting streptomycin solution through a column packed with activated carbon, thereby adsorbing the streptomycin more readily and more completely than is possible utilizing previous methods, and at the same time materially reducing the amount of organic impurities adsorbed. The broth is passed through the column until assay indicates that the carbon is not adsorbing all of the activity in the broth. The carbon containing the adsorbed streptomycin is washed with water, followed by aqueous alcohol, after which the carbon is ready for elution.

The use of a carbon column to adsorb streptomycin from filtered or clarified fermentation broths offers surprising and unexpected advantages over the previously employed methods for adsorbing streptomycin. The quantity of carbon necessary in my new method is less than that formerly used since the carbon is more efficiently used to adsorb streptomycin. Employing prior adsorption methods, it was necessary to use large amounts of carbon in order to reduce the quantity of streptomycin in the spent broth. Thus it was necessary to employ an optimum amount of carbon, this quantity being determined empirically by an economic balance between the cost of employing additional carbon versus the amount of streptomycin discarded in the spent broth. Thus in the former method the quantity of adsorbed streptomycin per gram of carbon was about 10,000 units of streptomycin per gram of carbon. In contrast to this my improved procedure results in completely exhausting the streptomycin from the spent broth and at the same time achieving a concentration of adsorbed streptomycin as high as 50,000 units of streptomycin per gram of carbon.

The streptomycin is ordinarily eluted from the carbon by passing a strongly acidic aqueous solution through the column followed by an aqueous alcoholic solution. This procedure extracts substantially all of the streptomycin from the carbon and produces effluents having a concentration as high as 25 mg. of streptomycin base/ml. This elution operation is accomplished with no substantial decomposition of the streptomycin. This is particularly surprising because it would be expected that the addition of a strongly acidic aqueous solution directly to the carbon containing the adsorbed streptomycin would cause decomposition of streptomycin which is known to be unstable in strongly acid solution.

It is evident that this columnwise adsorption procedure, which facilitates continuous operation effects a very considerable saving in the cost of the equipment employed, since it makes possible the use of inexpensive columns instead of expensive agitated extraction kettles and filters. It likewise results in a very marked saving in labor, the reduction in cost of the activated carbon adsorbent.

Moreover, by this procedure, the amounts of organic impurities adsorbed and the inorganic impurities eluted are minimized. The streptomycin in the effluent is therefore so pure that it is possible to crystallize streptomycin hydrochloride calcium chloride complex directly therefrom. The use of strong (1.0–2.5 normal) aqueous hydrochloric acid solution (which is my preferred eluting agent), for the primary elution makes possible the preparation of streptomycin effluents of a potency nearly 30 times that previously obtainable, thus greatly reducing the size of evaporation equipment and minimizing the losses of streptomycin inherent in this concentration operation.

An additional advantage of my process, however, is that it achieves regeneration of the carbon column so that the activated carbon adsorbent can be used repeatedly before discarding. I have discovered that this can be accomplished by passing absolute methanol through the carbon following the elution operation. When the regeneration treatment is employed and the carbon reused for adsorbing additional streptomycin, it has been found that the adsorptive capacity of the carbon falls, after being reused two or three times, to approximately 70% of its original adsorptive capacity; and that the adsorptive capacity remains substantially constant at this level after repeatedly using the carbon for the adsorption operation.

In view of the evident economic advantages of repeatedly reusing the activated carbon adsorbent, it is ordinarily preferred to employ regenerated carbon when carrying out my improved process for the columnwise adsorption of streptomycin. Instead of regenerating the carbon, however, fresh activated carbon may be employed for each adsorption, if desired. Even when fresh carbon is used, my process makes possible a reduction of about 50 to 75% in the carbon requirements from that necessary utilizing previous methods for adsorbing streptomycin.

My process is generally applicable for recovering streptomycin from aqueous solutions. It is ordinarily employed for recovering streptomycin from fermentation broths resulting from the growth and metabolism of the streptomycin-producing organisms. When utilizing said fermentation broths, the broth is filtered to remove mycelium and any foreign materials which may be present, usually with the addition of a filter aid such as diatomaceous silica. The pH of this filtered broth is adjusted to between about 5.0 and 9.5, but it is ordinarily preferred to adjust the pH to approximately 7.0 to 9.5, since these alkaline conditions minimize the adsorption of organic impurities and result in the direct preparation of a streptomycin of higher potency. The broth or other aqueous streptomycin solution is then passed through a column containing activated carbon (which may be fresh material), but is ordinarily regenerated carbon from a preceding run. The carbon capacity varies, depending on the particular carbon employed, but it is usually found to be between about 15 and 50 mg. of streptomycin per gram of carbon. The carbon capacity is also affected by the nature of the broth.

The passage of the broth through the carbon is continued until assay indicates "break-through," i. e. the carbon is not adsorbing all of the activity in the broth due to approaching saturation of the carbon. After the desired "break-through," the carbon is washed with water, preferably utilizing the same contact time as was used with the broth. This water-wash is followed by an aqueous methanol-wash after which the carbon is ready for elution.

The elution of the streptomycin from the column of carbon can be effected by any of the commonly used methods for eluting streptomycin. For example, it is possible to employ aqueous, aqueous alcoholic, or alcoholic solutions of organic or inorganic acids for this purpose. More specifically, the following solutions can be employed: aqueous hydrohalic acids, such as hydrochloric or hydrobromic, aqueous sulfuric acid, methanolic hydrochloric acid, methanolic sulfuric acid, methanolic formic acid, aqueous methanolic hydrochloric acid, aqueous-methanolic sulfuric acid, aqueous-methanolic formic acid, and the like. The presently preferred procedure comprises elution with aqueous hydrochloric acid, followed by aqueous methanol solution.

The acid (1.0—2.5 normality) is added, undiluted, to the column in an amount equal to approximately ¾ of that necessary to bring the pH of the final effluent to 3. It has been found best to employ a ratio of about 25 cc. of normal hydrochloric acid per 50 gms. of carbon. After the addition of the undiluted 1.0 normal acid which is passed through the column until the level has reached the level of the carbon bed, a solution of 0.1 normal acid-30% aqueous methanol is added to complete the elution. The amount of 0.1 normal acid added at that time is sufficient to bring the pH of the final effluent to approximately 3. In operating the column, the first alkaline and neutral effluent, after the acid addition, is ordinarily combined with the previous methanol wash. When the pH of the effluent leaving the column falls to 6, however, the effluent, which now contains streptomycin, is collected until the effluent pH is approximately 3. This rich effluent fraction contains 85–95% of the streptomycin adsorbed by the carbon. As soon as the effluent pH reaches approximately 3, the 0.1 normal acid-methanol solution is discontinued, and a solution of 30% aqueous methanol (without acid) is then added to recover the residual 5–15% of streptomycin. The column is then washed with absolute methanol thereby regenerating the carbon, and finally with water containing a trace of sodium hydroxide to bring the pH of the effluent to almost neutrality. The carbon column is then ready for reuse.

The rich effluent fraction containing the streptomycin hydrohloride is adjusted to a pH of approximately 6.0 to 6.5, evaporated to approximately 20–25% solids, and then dehydrated by distillation with methanol. The methanol solution is then diluted with acetone. The streptomycin hydrochloride, which precipitates, is recovered and dried by conventional means. If desired, the methanol solution can be chromatographed employing alumina or if desired, converted to crystalline calcium chloride complex.

The following examples illustrate methods of carrying out the present invention, but it is to be understood that these examples are given by way of illustration and not of limitation.

Example 1

An adsorption column having an inside diameter of 1″ was prepared using 20 gms. of activated carbon. Streptomycin broth assaying approximately 108 units/ml. was made alkaline to pH of aproximately 7.9 with sodium hydroxide. 2270 cc. of this broth was passed through the carbon column and the spent broth assayed as follows:

| Fraction | Vol. ml. | Units/ml. |
| --- | --- | --- |
| 1 | 500 | 0 |
| 2 | 1,000 | 0 |
| 3 | 650 | 0 |

The column was then eluted by adding 5 cc. of 2.5 normal aqueous hydrochloric acid directly to the column followed by 30% aqueous methanol. The effluent was collected in 3 different fractions which analyzed as follows:

| Fraction | Vol. in ml. | Units/ml. | Total Units |
| --- | --- | --- | --- |
| 1 | 100 | 1,280 | 128,000 |
| 2 | 200 | 270 | 54,000 |
| 3 | 200 | 33 | 6,600 |
|  |  |  | 188,600 |

This procedure resulted in 75% recovery of the streptomycin originally present in the broth. Over ⅔ of the streptomycin was recovered in the first 20% of the effluent.

Example 2

50 gms. of sieved activated carbon (20–40 mesh) is slurried with water and the slurry evacuated for about 2 hours to remove air from the carbon. The carbon slurry is poured into a column containing a plug of glass wool and a thin layer of sea sand. With a column 1″ in diameter, an 11″ bed is obtained with 50 gms. of carbon.

A streptomycin broth (having a pH of about 7) is fed to the top of the column by gravity at a rate of approximately 9.5 ml. broth per minute. Approximately 12 liters of broth having a streptomycin content of 150–200 units per cc., is put through the column at which time the "break-through" is approximately 20–30 units of streptomycin per ml. (The amount of neutral broth necessary to reach this "break-through" varies from 10 to 13 liters depending on the potency of the broth.)

After the desired "break-through" is reached, the carbon is immediately washed with water at the same contact time as employed in the case of the broth. After a 500 ml. water-wash, the effluent should be colorless. The water-wash is followed by a 30% aqueous methanol wash, employing a contact time of approximately 45 minutes. After approximately 150 mls. of 30% aqueous methanol has passed through the column, the effluent should be colorless. The column can be allowed to stand in contact with 30% aqueous methanol prior to elution.

After the 30% methanol wash, the column is ready for elution. The 30% methanol is drawn from the bottom of the column until the liquid level is at the level of the carbon bed. 25 ml. of 1.0 normal hydrochloric acid in 30% methanol solution (100 mls. contains 30 mls. absolute methanol, 8 ml. concentrated hydrochloric acid and 62 mls. water) is added and allowed to flow through the carbon column at a rate of approximately 0.5 ml. per minute (288 minutes contact time). When the level of the solution reaches the top of the carbon bed a solution of 0.1 normal hydrochloric acid-30% methanol (100 mls. contains 30 ml. absolute methanol, 0.8 ml. concentrated hydrochloric acid and 69.2 ml. water) is added.

The pH of the effluent from the column is checked continually. Starting when the effluent pH falls to 6.0 (approximately 90–100 mls. after the acid solution is added to the carbon bed), a rich fraction of about 300 mls. is collected at a rate of 0.5 ml. per minute, at which time the pH of the effluent reaches approximately 3.0. This rich eluate fraction ordinarily contains 85–95% of the streptomycin adsorbed by the carbon. The 0.1 normal hydrochloric acid-30% methanol solution is then discontinued, and a solution of 30% methanol (without acid) is added to the carbon to recover residual streptomycin.

The carbon is then washed with absolute methanol at a rate of about 1.0–1.5 ml. per minute until the methanol effluent is colorless; (approximately 250 ml. methanol required). The absolute methanol wash contains 0–5% of the streptomycin adsorbed by the carbon. The column is then washed with water containing a trace of sodium hydroxide to bring the pH of the effluent to about neutrality. The carbon column is then ready for reuse.

Various changes and modifications may be made in my process as described without departing from the scope of my invention. To the extent that these changes and modifications are within the purview of the annexed claims, they are to be considered as part of my invention.

I claim:

1. The process of recovering streptomycin from an aqueous solution thereof which comprises passing said aqueous solution through a column containing activated carbon, said carbon thereby adsorbing said streptomycin, passing an acidic aqueous solution through said column thereby eluting said streptomycin, passing absolute methanol through said column followed by water thereby regenerating said carbon, and repeating the foregoing cycle.

2. The process of recovering streptomycin from an aqueous solution thereof which comprises adjusting the pH of said aqueous solution to between about 7.0 and 9.5, passing the resulting solution through a column containing activated carbon, said carbon thereby adsorbing said streptomycin, passing an aqueous alcoholic solution of an inorganic acid through said column thereby eluting said streptomycin, passing absolute methanol through said column followed by water thereby regenerating said carbon, and repeating the foregoing cycle.

3. The process of recovering streptomycin from an aqueous solution thereof which comprises adjusting the pH of said aqueous solution to between about 7.0 and 9.5, passing the resulting solution through a column containing activated carbon, said carbon thereby adsorbing said streptomycin, passing an aqueous hydrochloric acid solution having a normality of between about 1 and 2.5 through the column, the amount of said aqueous hydrochloric acid solution being equal to approximately ¾ of that necessary to bring the pH of the final effluent to 3, followed by an aqueous-methanol solution of hydrochloric acid, thereby eluting said streptomycin, passing absolute methanol through the column followed by water thereby regenerating said carbon, and repeating the foregoing cycle.

4. The process of recovering streptomycin from an aqueous solution thereof which comprises adjusting the pH of said aqueous solution to between approximately 7.0 and 9.5, passing the resulting solution through a column containing activated carbon, said carbon thereby adsorbing said streptomycin, passing an aqueous hydrochloric acid solution having a normality of approximately 1.0 through the column, the amount of said aqueous hydrochloric acid solution being equal to approximately ¾ of that necessary to bring the pH of the final effluent to 3, followed by aqueous-methanol solution of hydrochloric acid, thereby eluting said streptomycin, passing absolute methanol through said column followed by water thereby regenerating said carbon, and repeating the foregoing cycle.

5. The process of preparing a relatively concentrated streptomycin solution directly from a filtered fermentation broth, which comprises adjusting the pH of said broth to between approximately 7.0 and 9.5, passing the resulting solution through a column containing activated carbon, said carbon thereby adsorbing said streptomycin, passing wash-water followed by aqueous methanol through the column, thereby washing residual broth from said column, passing an aqueous hydrochloric acid solution having a normality of approximately 1.0 through the column, the amount of said aqueous hydrochloric acid solution being equal to approximately ¾ of that necessary to bring the pH of the final effluent to 3, followed by an aqueous-methanol solution of hydrochloric acid, thereby eluting said streptomycin and producing an effluent containing a relatively high concentration of streptomycin, passing absolute methanol through said column followed by water containing a trace of sodium hydroxide thereby regenerating said carbon and bringing the pH of the effluent to about neutrality, and repeating the foregoing cycle.

FRANK J. WOLF.

REFERENCES CITED

The following references are of record in the file of this patent:

UNITED STATES PATENTS

| Number | Name | Date |
|---|---|---|
| 2,449,866 | Waksman et al. | Sept. 21, 1948 |
| 2,461,922 | Rake et al. | Feb. 15, 1949 |

OTHER REFERENCES

Carter et al., J. Biol. Chem., vol. 160 (1945), pp. 338–342, 5 pages.

Kuehl et al., J. A. C. S., vol. 68 (1946), pp. 1460–1462, 3 pages.

Kocholaty et al., Arch. of Biochem. (1947), pp. 55–64, 10 pages.

Vander Brook et al., J. Biol. Chem., v. 165 (1946), 464–465, 2 pages.